Figure 1:
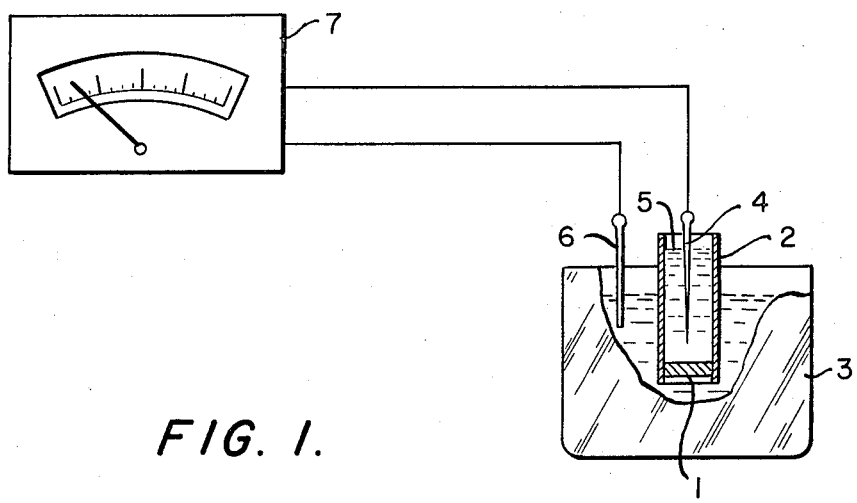

United States Patent [19]
Hilton et al.

[11] 3,821,100
[45] June 28, 1974

[54] COPPER ION SELECTIVE SENSOR
[75] Inventors: Albert R. Hilton, Richardson; Isaac Trachtenberg, Dallas, both of Tex.
[73] Assignee: The United States of America as represented by the Secretary of the Interior, Washington, D.C.
[22] Filed: Feb. 23, 1973
[21] Appl. No.: 335,397

[52] U.S. Cl............ 204/195 G, 106/47 R, 204/1 T
[51] Int. Cl...................... G01n 27/36, G01n 27/46
[58] Field of Search........ 204/195 G, 1 T; 106/47 R

[56] References Cited
UNITED STATES PATENTS
3,709,813  1/1973  Johnson et al.................. 204/195 G Primary Examiner—G. L. Kaplan
Attorney, Agent, or Firm—William S. Brown; Frank A. Likasik

[57] ABSTRACT

The activity of cupric ions in aqueous solution is determined by means of a sensor comprising a glass having the composition $(R)_x (As_2S_3)_{1-x}$, where R is CuO, CuS, $Cu_2S$ or Cu and $x$ is from about 0.10 to about 0.25.

2 Claims, 3 Drawing Figures

PATENTED JUN 28 1974  3,821,100

SHEET 1 OF 2

COPPER ION SELECTIVE SENSOR

Detection and measurement of copper ions in aqueous solution finds utility in a variety of environmental and industrial applications. For example, excessive concentrations of copper in sea water, resulting from waste discharge, are toxic to marine organisms, and may progress through the ecological food chain to affect numerous species. Means for detecting and measuring copper in sea water is therefore important in the environmental-pollution area. In addition, efficient determination of copper concentrations is essential in attaining optimum yields in chemical processes such as plating and etching by means of aqueous baths. Other applications include determination of copper in various materials such as pharmaceuticals, foods, pesticides, etc.

Ion selective electrodes in common use are generally based on glassy silicate systems. The rapid diffusion of alkali and alkaline earth metallic ions make such systems particularly well suited for the detection of the same ions in water solution. Most natural waters have high concentrations of the alkali metal and alkaline earth metal ions always present. Because the diffusion of these ions is so rapid, the use of silicate systems to monitor heavier or larger ions in solution has not been very successful, especially in natural waters. Recent work has shown that glasses based on chalcogen elements other than oxygen (S, Se, Te) can be used as a basis for ion selective electrodes. The mechanism responsible for the electrochemical potential in these materials is not the same as the silicate systems and they have therefore been found to be useful as monitors of heavy metallic ions, for example $Fe^{+3}$, in natural waters.

It has now been found, in accordance with the invention, that an ion selective sensor for detecting and measuring copper ion concentration in aqueous solution may be fabricated from a glass having the formula $(R)_x(As_2S_3)_{1-x}$, where R is CuO, CuS, Cu$_2$S or Cu and $x$ is about 0.10 to 0.25. A glass composition of about $(CuO)_{0.15}(As_2S_3)_{0.85}$ has been found to be especially effective, particularly from the standpoint of lifetime reproducibility.

The $(R)_x(As_2S_3)_{1-x}$ glass may be prepared by any conventional glass-making procedure. In a preferred procedure, a mixture of CuO, CuS, Cu$_2$S or Cu and As$_2$S$_3$, in the proportions desired in the glass product, is placed in a quartz ampule. The ampule, containing the reaction mixture, is then evacuated to a pressure of about $10^{-5}$ to $10^{-3}$ mm of Hg., sealed and placed in a rocking furnace. The reaction mixture is then slowly heated to a temperature sufficient to insure that the reactants are in a liquid state. A temperature range of about 500° to 700° C is usually sufficient. The reaction mixture is then maintained at this temperature, with rocking to ensure admixture of the reactants, for a period of about 4 to 64 hours, preferably about 24 hours. The resulting molten mass is slowly cooled to slightly above the softening point, i.e., about 400° C, and then rapidly air-quenched to the solid state.

The CuO, CuS, Cu$_2$S or Cu and the As$_2$S$_3$ are preferably employed in essentially pure form. Native orpiment may, however, usually be employed as the As$_2$S$_3$ component. The reactants are preferably employed in the form of powders of mesh size of about 40 to 200. In addition, thorough mixing of the reactants prior to addition to the quartz ampule, or prior to melting in the ampule, has generally been found to give best results.

Figure 2:
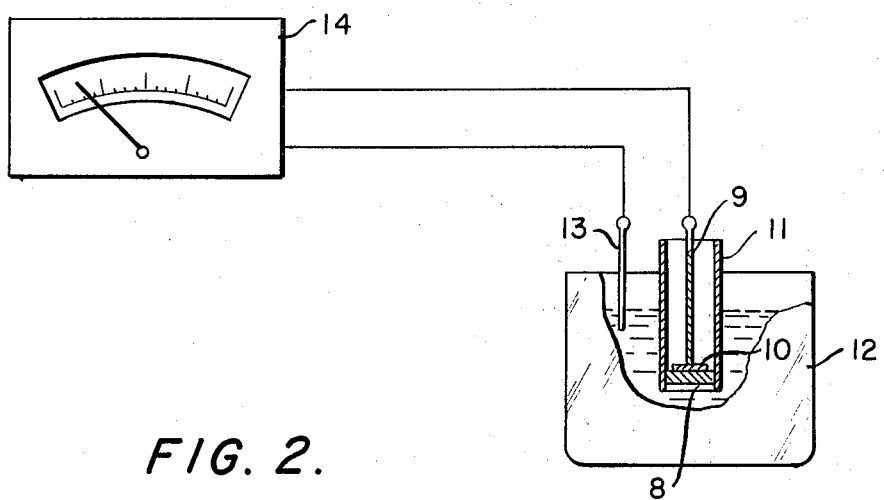

The sensors of the invention may be used in either membrane or electrode configurations, as illustrated diagrammatically in FIGS. 1 and 2 of the accompanying drawings. FIG. 1 illustrates use of the sensor in a membrane configuration. For this purpose, the glass is employed in the form of a disc having a thickness of about 1.0 to 2.5 mm and a diameter of about 5 to 10 mm. Optimum thickness and size of the disc may, however, vary considerably depending on the specific size and type of apparatus employed, the type of solution to be monitored, the reference electrode, etc., and are best determined experimentally.

Referring to FIG. 1, glass disc membrane 1 is sealed in the bottom of tube 2, which may be of any suitable inert material, such as Plexiglas (polymethylmethacrylate polymer), is immersed in solution 3, the test solution, i.e., the solution to be measured or monitored. Reference electrode 4 is mounted within tube 2 which is filled with a reference solution 5 of known ion concentration. In this configuration, a second reference electrode 6 is immersed in the test solution, and reference electrodes 4 and 6 are connected to high-impedence voltmeter 7.

Reference electrodes 4 and 6 may be any conventional reference electrodes such as a saturated calomel electrode or a silver chloride electrode, provided only that they are compatible with the test and reference solutions. Reference solution 5 will consist of a solution having a composition similar to that of the test solution and containing a known concentration of copper ions.

FIG. 2 illustrates use of the sensor in an electrode configuration. For this purpose, an electrode is prepared by providing a glass disc of the type described above with a layer or film of conductor metal such as gold, platinum or palladium and a suitable lead. The conductor metal is readily applied by conventional methods such as vacuum-deposition, and the lead is connected to the conductor metal by a conventional method such as soldering. The lead side of the electrode is then sealed in a tube of an inert material, such as Plexiglas, in order to isolate the lead side of electrode from the test solution.

Referring to FIG. 2, glass disk 8 is connected to lead 9 via a layer of conductor metal 10. The thus-formed electrode is sealed in tube 11 and immersed in test solution 12. Reference electrode 13, which may be any conventional electrode as described above, is also immersed in solution 12 and both electrodes are connected to high-impedance voltmeter 14.

Numerous ions other than $Cu^{+2}$ may be present in the test solution without interfering with the measurement of $Cu^{+2}$ concentration. Univalent ions, such as $Na^+$, $K^+$ and $H^+$, do not interfere. In particular, the sensor of the invention is not pH dependent as long as $Cu^{+2}$ ions remain in the test solution. $Ca^{+2}$, $Ni^{+2}$, $Pb^{+2}$ and $Mn^{+2}$ do not interfere, and $Fe^{+2}$ and $F^{+3}$ interfere only when their concentration is substantially greater than that of the $Cu^{+2}$. Furthermore, the device of the invention may be used for measurement of $Cu^{+2}$ concentration in media having a high chloride ion concentration, thus making it effective for use in measuring or monitoring $Cu^{+2}$ concentration in media such as sea water.

The following examples will more specifically illustrate the invention.

Example 1

A disc 8.0 mm in diameter and 1.5 mm in thickness, and consisting of $(CuO)_{0.15}(As_2S_3)_{0.85}$, was prepared by the procedure described above. This disc was sealed in a Plexiglas tube 13 cm long and of O.D. of 1.5 cm and I.D. of 1.3 cm. The tube was filled with a reference solution consisting of $10^{-3}$ M $CuCl_2$ and 0.1 M NaCl and was then immersed in the test solution, as shown in FIG. 1. The test solution consisted of an aqueous solution of 0.1 M NaCl and varying concentrations of $CuCl_2$. Ag/AgCl reference electrodes were then immersed in the test solution and in the reference solution, and both were connected to a high impedence voltmeter.

Figure 3:
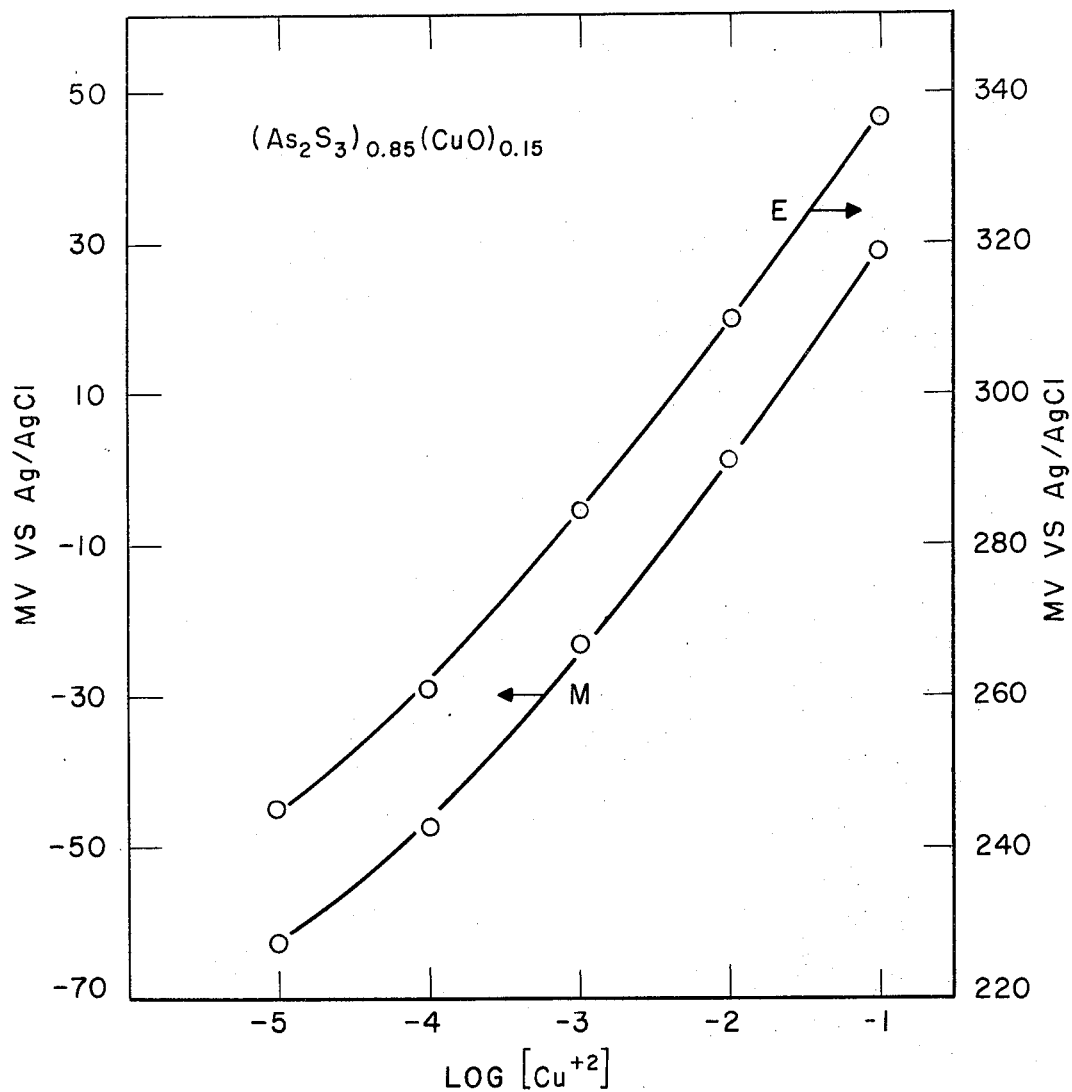

Results are shown by the lower curve in FIG. 3, which is a plot of the logarithm of the concentration of cupric ion in the test solution against the potential developed vs the reference electrode.

Example 2

A $(CuO)_{0.15}(As_2S_3)_{0.85}$ disc similar to that of Example 1 was coated on one side with a 10 microinch-thick layer of gold by means of vapor deposition. A platinum-wire lead is secured to the gold by means of silver micropaint, and the lead side of the thus-formed electrode is sealed in a Plexiglas tube similar to that employed in Example 1. This electrode and a Ag/AgCl reference electrode were immersed in a test solution and connected to a high-impedence voltmeter, as shown in FIG. 2. The test solution again consisted of an aqueous solution of 0.1 M NaCl and varying concentrations of $CuCl_2$. Results are shown by the upper curve in FIG. 3, which is a plot of the logarithm of the concentration of cupric ion in the test solution against the potential developed vs the reference electrode.

We claim:

1. A device for measuring the activity of cupric ions in aqueous solution comprising a cupric ion-selective sensor and at least one reference electrode, said sensor comprising a glass having the formula $(CuO)_x(As_2S_3)_{1-x}$, where $x$ is about 0.10 to about 0.25.

2. The device of claim 1 in which the glass has the formula $(CuO)_{0.15}(As_2S_3)_{0.85}$.

* * * * *